US012687386B2

(12) United States Patent
Boltje et al.

(10) Patent No.: US 12,687,386 B2
(45) Date of Patent: Jul. 21, 2026

(54) METHOD AND APPARATUS FOR MICROMACHINING A SAMPLE USING A FOCUSED ION BEAM

(71) Applicant: DELMIC IP B.V., Delft (NL)

(72) Inventors: Daan Benjamin Boltje, Delft (NL); Mart Guus Ferdinand Last, Delft (NL); Marit Rosa Smeets, Delft (NL); Caspar Theodorus Hugo Jonker, Delft (NL); Marcin Stefan Zielinski, Delft (NL)

(73) Assignee: DELMIC IP B.V., Delft (NL)

( * ) Notice: Subject to any disclaimer, the term of this patent is extended or adjusted under 35 U.S.C. 154(b) by 144 days.

(21) Appl. No.: 18/571,830

(22) PCT Filed: Jun. 21, 2022

(86) PCT No.: PCT/NL2022/050350
§ 371 (c)(1),
(2) Date: Dec. 19, 2023

(87) PCT Pub. No.: WO2022/271016
PCT Pub. Date: Dec. 29, 2022

(65) Prior Publication Data
US 2024/0280357 A1 Aug. 22, 2024

(30) Foreign Application Priority Data

Jun. 21, 2021 (NL) ...................................... 2028497

(51) Int. Cl.
*G01B 11/06* (2006.01)
(52) U.S. Cl.
CPC ...... *G01B 11/0683* (2013.01); *G01B 11/0675* (2013.01)

(58) Field of Classification Search
CPC .. G01B 9/0203; G01B 9/02091; G01B 11/22; G01B 15/00; G01B 9/02; G01B 9/02004;
(Continued)

(56) References Cited

U.S. PATENT DOCUMENTS 10,446,369 B1 10/2019 Phillips et al.
2002/0170675 A1 11/2002 Libby et al.
(Continued)

FOREIGN PATENT DOCUMENTS

DE 19723729 A1 12/1998
EP 3436807 B1 * 12/2020 ......... G01R 31/2831
(Continued)

OTHER PUBLICATIONS

International Search Report from corresponding PCT Application No. PCT/NL2022/050350, Sep. 23, 2022.
(Continued)

*Primary Examiner* — Michael P Stafira
(74) *Attorney, Agent, or Firm* — Workman Nydegger

(57) ABSTRACT

A method and an apparatus for micromachining samples are provided. The apparatus includes an integral combination of a sample holder, a focused ion beam (FIB) exposure system for projecting a FIB onto a sample, and a light optical microscope (LM). The LM is configured for imaging or monitoring the sample during and/or after FIB exposure. The method includes the steps of using the LM projecting light towards the sample and collecting reflected and/or transmitted light from said sample; analyzing the collected light and establishing a measure for the modulation of an intensity of said collected light due to an optical interference of light from a first surface of the sample and light from a second surface of the sample; and using the measure for the modulation of the intensity for establishing a measure for the distance between said first surface and said second surface.

19 Claims, 10 Drawing Sheets

(58) Field of Classification Search
CPC ............ G01B 9/02028; G01B 9/02044; G01B
9/02058; G01B 9/02083; G01B 11/14;
G01B 11/002; G01B 11/16; G01B
11/303; G01B 21/32; G01B 11/0675;
G01B 11/0683; G01B 11/02; G01B
11/165; G01B 15/04; G01B 2290/15;
G01B 2290/70; G01B 7/16; G01B
9/02034; G01B 9/02051; G01B 11/026;
G01B 11/08; G01B 11/12; G01B 15/02;
G01B 2210/56; G01B 7/12; G01B 7/13;
G01B 7/34
See application file for complete search history.

(56)                      References Cited

U.S. PATENT DOCUMENTS

| | | | |
|---|---|---|---|
| 2013/0146763 A1* | 6/2013 | Kawada ................ | H01J 37/222 |
| | | | 382/217 |
| 2017/0120337 A1* | 5/2017 | Kanko ............... | B23K 15/0013 |

FOREIGN PATENT DOCUMENTS

| | | | | |
|---|---|---|---|---|
| JP | 2020537125 A | * | 12/2020 | ........ G01B 11/0625 |
| WO | 2013001955 A1 | | 1/2013 | |
| WO | WO-2018136622 A1 | * | 7/2018 | ............. B22F 10/36 |

OTHER PUBLICATIONS

Dutch Search Report from corresponding NL Application No.
2028497, Mar. 3, 2022.

\* cited by examiner

METHOD AND APPARATUS FOR MICROMACHINING A SAMPLE USING A FOCUSED ION BEAM

BACKGROUND

Field of the Invention

The invention relates to a method and an apparatus for micromachining a sample using a Focused Ion Beam and a correlated inspection apparatus for inspecting a micromachined sample. In particular, the invention relates to an apparatus and method for micromachining samples by means of a focused ion beam, to produce samples suitable for inspection in a charged particle beam inspection apparatus, for example an electron microscope.

Description of the Related Art

Focused Ion Beam (FIB) micromachining of electron microscopy samples is a preparation method which allows to machine samples with high precision and without inducing mechanical artefacts, as for example may be induced by ultra-microtomy. In particular, the micromachining of a sample by means of a FIB can be used, for example, for manufacturing of lamella (thin slices) of a sample, which lamella are typically used for imaging the sample by means of a Transmission Electron Microscope (TEM).

In order to control, monitor and/or optimize the FIB micromachining process, it is desired to determine the thickness and quality of the lamella, preferably in the position of the sample where it can be micromachined by the FIB.

Although it is possible to use a FIB apparatus in an imaging mode, the resulting images commonly have a low contrast and resolution. Furthermore, FIB imaging introduces a risk of:

removing sample material, in particular when using FIB imaging on biological samples, and/or implanting heavy ions.

In addition, FIB imaging requires changing the sample orientation with respect to the incident focused ion beam, which adds a requirement that the apparatus comprises a sample stage with a long range of tilt.

To solve one or more of these problems, dual beam systems, combining a FIB with a Scanning Electron Microscope (SEM), are known in the art. These dual beam systems allow to use the SEM to image the sample for navigating and positioning the sample in order to machine a position of interest, and for parallel monitoring of the micromachining process by the FIB.

A method used to establish an estimate of the thickness of a lamella as manufactured using a FIB in a dual beam system as described above, is to compare the contrast in SEM images obtained with different acceleration voltages. In addition or alternatively, one can establish whether or not a lamella is too thick, by looking at structures inside the lamella; in case the structures inside the lamella are not visible in the SEM image, the lamella is likely too thick.

SUMMARY OF THE INVENTION

A disadvantage of using a SEM to determine the thickness of a sample, in particular a lamella is, that this method introduces a dose of electrons onto the sample, which may alter the sample and/or which may introduce artefacts in the sample. In addition, the above described SEM methods require an integrated SEM/FIB system, which are relatively complex and expensive systems. Furthermore, the above described SEM methods to establish an estimate of the thickness of a sample, are relatively inexact, which results in a relatively coarse control over the sample thickness as produced by the FIB.

It is an object of the present invention to provide an alternative method for determining a measure of the thickness of a sample that is micromachined using a FIB, which preferably obviates at least one of the above disadvantages at least partially. In addition or alternatively, it is an object of the present invention to provide a method to monitor the sample thickness during micromachining of the sample by means of a FIB.

According to a first aspect, the present invention provides a method for inspecting a sample in an apparatus for micromachining samples, wherein the apparatus comprises an integral combination of:

a sample holder for holding the sample, a focused ion beam exposure system comprising an assembly for projecting a focused ion beam onto a first position where, in use, the focused ion beam impinges on the sample held by the sample holder, and a light optical system, wherein the light optical system comprises a light source for projecting light towards the sample holder, light collecting optics for collecting at least part of the light from the sample on the sample holder, and a detector for detecting at least a part said collected light, wherein the method comprises the steps of:

providing a sample that has at least partially been micromachined by the focused ion beam exposure system;

projecting light towards the sample and collecting at least part of the light from said sample;

analyzing the light collected by the light collecting optics and establishing a measure for the modulation of an intensity of said collected light due to an optical interference of said light from a first surface of the sample and light from a second surface of the sample, wherein the first surface of said sample is facing towards the light collecting optics of the light optical system and wherein the first surface is arranged in between the second surface of sample and the light collecting optics of the light optical system, and wherein said measure is established for one or more positions on the sample and/or for various wavelengths of the projected light, using the measure for the modulation of said collected light due to the optical interference for establishing a measure for the distance between said first surface and said second surface.

Preferably, the light optical system comprises an imaging detector and/or a wavelength selective element. The wavelength selective element preferably comprises a spectrometer or one or more light optical wavelength selective filters, such as a color filters, and can be arranged in front of the light source and/or in front of the detector.

The method of the present invention uses an apparatus in which a Focused Ion Beam (FIB) exposure system and a light optical system are integrated, such that a light beam and/or the FIB can interact subsequently and/or simultaneously with a sample on the sample holder. The presence of the light optical system allows to apply thin-film optical interferometry as a non-destructive method to obtain a measure for the thickness of a FIB-milled sample, in particular the thickness of an at least partially produced lamella in the sample as produced by the focused ion beam exposure system. As such the present method provides an alternative way for determining a measure for the thickness of a FIB-milled sample, in particular the thickness of an at least partially produced lamella in the sample as produced by the focused ion beam exposure system.

In addition, by using light for establishing a measure for the thickness of a sample, it is not necessary to have a FIB system with an integrated SEM. Furthermore, this method does not introduce a dose of electrons onto the sample. Accordingly, any alteration of the sample and/or an introduction of artefacts in the sample due to an irradiation by electrons, can be avoided.

It is not evident that optical interferometry can be used on a FIB-milled samples. However, the inventors have found that typical FIB-milled sample exhibit very low surface roughness. Due to the low surface roughness, scattering of incident light is low, and the FIB-milled sample exhibit substantially a specular reflection, in particular at the first and second surface of the at least partially FIB-milled sample, and thus thin-film interferometry can be used.

In particular, when light is directed towards the at least partially FIB-milled sample, a first part of this light is reflected on the first surface and a second part of this light is transmitted through the first surface into the sample. This second part of light reaches the second surface and is at least partially reflected at said second surface. The light reflected at said second surface travels again through the sample, reaches the first surface and is at least partially transmitted through said first surface. Accordingly, the part of the second part of light which is transmitted through said first surface, has traveled an additional distance from the first surface to the second surface, and from the second surface to the first surface, with respect to the first part of the light that is directly reflected on the first surface. This part of the second part of the light can interfere with the first part of the light that is directly reflected on the first surface, and whether the interference is constructive or destructive depends, inter alia, on the distance between the first surface and the second surface, on the refractive index of the material of the sample, on the angle of incidence, and on the wavelength of the light. For example, when the parts of the light are considered that experiences destructive interference, the following dependency can be used to determine the thickness of a sample:

$$d = \frac{m\lambda}{2n(\lambda)\cos\theta}$$

wherein d is the distance between the first surface and the second surface and corresponds to the thickness of the sample, m is an integer, A is the wavelength of the light, $n(\lambda)$ is the refractive index of the material of the sample (which may be dependent on the wavelength), and $\theta$ is the angle of incidence of the light on the second surface. It is noted, that the above equation presumes that the FIB-milling of a sample is commonly carried out in vacuum, and the refractive index of the medium surrounding the sample is the refractive index of vacuum=1.0. Furthermore, since the index of refraction of the material of the sample is larger than the refractive index of vacuum, the reflection that occurs at the first surface will introduce a 180 degree phase shift in the reflected light wave.

There are several approaches to use optical interferometry in order to establish a measure for the thickness of a sample. Several of these alternative ways are presented as embodiments of the invention, as described below.

According to a first approach, the detector comprises a spectrometer which is configured for measuring the intensity of the collected light from the sample as a function of the wavelength of said light, wherein the light source is configured for projecting light with a predetermined spectral intensity distribution towards the sample, wherein the step of analyzing the light collected by the light collecting optics further comprises:

measuring the intensity of the collected light from the sample as a function of the wavelength of said light using said spectrometer in order to establish the measure for the modulation of the intensity of said collected light due to the optical interference of said light from the first surface of the sample and light from the second surface of the sample, for various wavelengths of the projected light, and using the wavelength dependence of the modulation of the intensity of said collected light for establishing a measure for the distance between said first surface and said second surface.

In this embodiment, the spectrometer is used to measure a spectrum of the collected light, which spectrum comprises values for the intensity of the collected light as a function of the wavelength. Said spectrum is used to establish the modulation of the intensity of said collected light due to the optical interference as a function of the wavelength. The modulation as a function of the wavelength is used to establish a measure for the distance between the first surface and the second surface of the sample, and thus to establish a measure for the thickness of the sample.

For example, by establishing at which wavelengths the intensity of the collected light has a minimum due to destructive interference, a measure for the thickness d of the sample can be calculated from the expression described above, in particular in case the refractive index $n(\lambda)$ of the material of the sample, and the angle of incidence $\theta$ of the light on the second surface are known. In addition or alternatively, in case the spectrum of the collected light comprises multiple minima, the integers of adjacent minima are m and (m+1), respectively, and a value for m can be established from the wavelengths of the adjacent minima.

It is noted that we can also derive a similar expression for the maxima in the intensity of the collected light due to constructive interference. Accordingly, by establishing at which wavelengths the intensity of the collected light has a maximum due to constructive interference, we can also calculate a measure for the thickness d of the sample.

In an alternative example, a theoretical relation between the reflectivity of light at a thin film with thickness d due to interference, and the wavelength of light is used for curve fitting of the modulation of the intensity of said collected light due to the optical interference as a function of the wavelength, to establish a measure for the thickness d. The modulation of the intensity of said collected light is preferably obtained using the measured spectrum of the collected light as a function of the wavelength, which is preferably corrected for intensity variations as a function of the wavelength of the light projected onto the sample by the light source. Accordingly, in an embodiment, the measured spectrum of the collected light is normalized by dividing the measured spectrum by the spectrum of the projected light from the light source.

A theoretical relation between the reflectivity R at a thin film and the wavelength is:

$$R(\lambda, d) \propto \sin^2\left(\frac{\pi n(\lambda) d\cos(\theta)}{\lambda}\right)$$

where d is the thickness of the sample, λ is the wavelength of the light, n(λ) is the refractive index of the material of the sample (which may be dependent on the wavelength), and θ is the angle of incidence of the light on the second surface. A measure for the thickness of the sample can be established from the parameters of the curve with the least Root Mean Square value obtained by said curve fitting.

In an embodiment, the light source is configured to emit light comprising multiple wavelengths, preferably wherein said multiple wavelengths are within a wavelength range from 400 to 1100 nm. This wavelength range is particularly suitable because for the samples used for TEM characterization, which commonly have a thickness in a range from 100 to 300 nm, at least one maximum and/or minimum of the interferometric reflectance or transmittance can be expected in said wavelength range. Accordingly, within such a wavelength range sufficient variation in the interferometric reflectance or transmittance is expected to be able to establishing a measure for the distance between said first surface and said second surface, either by establishing the wavelength(s) where the maximum and/or minimum occurs, or by curve fitting the measured interferometric reflectance or transmittance as a function of the wavelength.

In an embodiment, the light source is configured to emit light comprising substantially all wavelengths within a wavelength range, preferably wherein said wavelength range comprises substantially all wavelengths between 400 and 1100 nm. Preferably, the light source is configured to emit light in a substantially continuous wavelength range. Accordingly, a more accurate determination of the wavelength at which a maximum and/or a minimum in the interferometric reflectance is possible. In addition or alternatively, a measurement over a substantially continuous wavelength range provides more data-points for the curve fitting.

In an embodiment, a theoretical relation between the reflectivity of light at a thin film with thickness d due to interference and the wavelength of light, is used for curve fitting of the modulation of the intensity of said collected light due to the optical interference as a function of the wavelength, to establish a measure for the thickness d, preferably wherein said curve fitting uses the following theoretical relation between the reflectivity R at a thin film and the wavelength:

$$R(\lambda, d) \propto \sin^2\left(\frac{\pi n(\lambda)d\cos(\theta)}{\lambda}\right)$$

where d is the thickness of the sample, λ is the wavelength of the light, n(λ) is the refractive index of the material of the sample, and θ is the angle of incidence of the light on the second surface.

In a second approach, the light source is configured for projecting light with at least three different wavelengths towards the sample on the sample holder, wherein the step of analyzing the light collected by the light collecting optics further comprises:

measuring the intensity of the collected light from the sample for each one of the at least three different wavelengths in order to establish the measure for the modulation of the intensity of said collected light due to an optical interference of the light from the first surface of the sample and light from the second surface of the sample, for each one of the at least three different wavelengths of the projected light, and using the wavelength dependence of the modulation of the intensity of said collected light for establishing a measure for the distance between said first surface and said second surface.

In this second approach, the light source is used to project light with at least three different wavelengths towards the sample and by measuring the collected light for each of these at least three different wavelengths, a value for the intensity of the collected light for each of the at least three different wavelengths can be obtained. Said value for the intensity of the collected light for each of the at least three different wavelengths is used to establish the modulation of the intensity of said collected light at each of the at least three different wavelengths due to the optical interference. The modulation at each of the at least three different wavelengths is used to establish a measure for the distance between the first surface and the second surface of the sample, and thus to establish a measure for the thickness of the sample.

In an embodiment, the light source is configured for projecting light with said at least three different wavelengths separately and/or consecutively towards the sample, and wherein the intensity of the collected light from the sample is separately and/or consecutively measured for each one of the at least three different wavelengths. In this embodiment, the wavelength selectivity is provided by the light source and substantially no wavelength selectivity, for example by providing a spectrometer or a set of optical filters, is required at the detector.

In an alternative embodiment, the light source is configured for projecting light with said at least three different wavelengths substantially simultaneously towards the sample, wherein the detector is configured for measuring the intensity of the collected light from the sample for each one of the at least three different wavelengths individually, preferably wherein the detector comprises at least three sensors, wherein each sensor of said at least three sensors is configured for detecting light with one of said at least three different wavelengths. Measuring the intensity for each one of the at least three different wavelengths individually can be done by splitting the collected light into at least three components. Each component comprising light with one of the at least three different wavelengths, for example by using wavelength selective beam splitters, and directing each of said at least three components, each comprising light with one of said at least three different wavelengths, onto a one of said at least three sensors.

Alternatively, the intensity for each one of the at least three different wavelengths individually can be done by splitting the collected light into at least three parts using a beam splitter. Each of said parts is subsequently filtered using an optical filter such that each one of said at least three parts is filtered to comprise light with one of the at least three different wavelengths. Each of said at least three parts are subsequently projected onto a sensor. Said sensor may comprise a pixelated detector.

Alternatively, the intensity for each one of the at least three different wavelengths individually can be done by providing each of said at least three sensors with a color filter wherein each color filter is configured to transmit light with one of said at least three wavelengths. By arranging said at least three sensors close to each other in an image plane of the light optical system, such as a light optical microscope, the at least three sensors measure the light from close adjacent areas on the sample, allowing to measure the intensity of the collected light for each of the at least three different wavelengths from closely adjacent areas of the sample. In case we restrict the number of different wavelengths to three wavelengths, each in one of the wavelengths in one of the ranges used to obtain a color image, a color CCD detector or RGB camera can be used for the measurements.

It is noted that, when the light source is configured for projecting light with said at least three different wavelengths substantially simultaneously towards the sample, the light source may also project light with other wavelengths than the wavelengths used for this measurement, and the light source may even emit light over a substantially continues wavelength range which covers said at least three different wavelengths. The light used for illuminating the sample does not need to be pure monochromatic.

It is further noted that, when the sample is imaged with the light optical system at said at least three different wavelengths, for example using proper filters that allow detection of collected light in blue, green and red; 440, 532 and 635 nm, for example, this results in a multi-color measurement of the collected light. This multi-color measurement can be combined to obtain an observed 'color' of the light from a position on the sample, which uniquely encodes the thickness of the sample at said position, at least within a thickness range of interest; from 100 nm up to approximately 1000 nm).

The above first and second approaches are in particular suitable for measuring the thickness of a part of a sample with a substantially constant thickness, at least over the area from which the light is collected. The first approach of measuring the spectrum of the collected light is more sensitive to the sample thickness and may provide a more accurate measure for the thickness. The second approach allows to measure three images (or more) of a region of the sample, each image for one of the three different wavelengths (or more), which allows a comparison of the thickness of the sample in different position within said region of the sample.

However, these first and second approaches are also suitable for measuring a change in thickness of a sample with a varying thickness. Accordingly, in an embodiment, the method according to the present invention is configured for inspecting a sample comprising a part with a substantially continuous increasing or decreasing thickness, wherein the step of analyzing the light collected by the light collecting optics further comprises:

measuring the intensity of the collected light from the sample as a function of the position on the sample, in particular on the part with a substantially continuous increasing or decreasing thickness and substantially in a direction in which the thickness of the sample increases or decreases, in order to establish the measure for the modulation of the intensity of said collected light due to the optical interference of said light from the first surface of the sample and light from the second surface of the sample, and using the position dependence of the modulation of the intensity of said collected light for establishing a measure for the change in distance between said first surface and said second surface in said part with the substantially continuous increasing or decreasing thickness.

The method according to this embodiment can use the wavelength dependence of the modulation of the intensity of said collected light for establishing a measure for the distance between said first surface and said second surface, as described in the first and second embodiment as described above. Accordingly, in an embodiment, the light source is configured to emit light comprising substantially all wavelengths within a wavelength range, preferably wherein said wavelength range comprises substantially all wavelengths between 400 and 1100 nm, wherein the modulation of the intensity of said collected light due to the optical interference of said light from the first surface of the sample and light from the second surface of the sample results in a change in the spectrum of the collected light with respect to the spectrum of the light from the light source, wherein said method further comprises the step of:

analyzing the change in the spectrum of the collected light as a function of the position along a line which extends over said part in the direction in which the thickness of the sample increases or decreases, and using said change in the spectrum as a function of the position along said line for establishing a measure for the change in distance between said first surface and said second surface.

Alternatively, according to a third approach, the method according to the first aspect of the invention is used for inspecting a sample comprising a part with a substantially continuous increasing or decreasing thickness, wherein the method further comprises the steps of:

configuring the light source for projecting light with a coherence length substantially equal or larger than the sample thickness, towards the sample on the sample holder, wherein the modulation of the intensity of said collected light due to the optical interference of said light from the first surface of the sample and light from the second surface of the sample results in one or more fringes, establishing a distance in which said one or more fringes extends over said part in the direction in which the thickness of the sample increases or decreases, and using the number of said one or more fringes, a value of a refractive index of the sample material, and the wavelength of the projected light for establishing a measure for the change in distance between said first surface and said second surface between the outermost fringes of the number of said one or more fringes, or using said distance and an angle between the FIB beam and the surface of the sample for establishing a measure for the change in distance between said first surface and said second surface between the outermost fringes of the number of said one or more fringes.

In case we us reflected light with wavelength $\lambda$ and we observe two adjacent fringes, the difference in thickness $\Delta d$ of the sample at the positions where the adjacent fringes are observed is $\Delta d = \lambda/2n$, where n is the refractive index of the sample material (when the angle of incidence $\theta$ is substantially 0 degrees; the light beam is directed substantially perpendicular to the surface of the sample). Accordingly, the change in the distance between said first surface and said second surface at the positions where the adjacent fringes are observed is $\Delta d$.

The changed in distance between said first surface and said second surface can also be characterized by an average angle $\alpha$ between the first surface and the second surface. This average angle $\alpha$ can be calculated by $$\sin(\alpha) = \Delta d / f = \lambda / (2nf)$$

wherein f is the distance between the positions where the adjacent fringes are observed, also denoted as the fringe spacing. Accordingly, the wedge angle $\alpha$ can be determined using the fringe spacing f as measured, the wavelength λ of the light, and the refractive index n of the material of the sample.

When f' is the distance between the outermost fringes of x successive fringes and Δd' is the difference in thickness of the sample at the positions of the outermost fringes, then $$\sin(\alpha) = \Delta d' / f' => \Delta d' = f' \sin(\alpha)$$

The embodiment according to this third approach is in particular suitable for measurements on lamella produced using FIB machining of a sample, because such a lamella comprises a wedge-shaped part which is produced due to the angle between the FIB beam and the surface of the sample, also denoted the FIB milling angle. In the wedge-shaped part, the interference pattern gives additional contrast in the image, allowing to measure the length f' of this wedged shaped part. When the FIB milling angle is known, for example approximately 10 degrees, the thickness d of the lamella can be calculated by:

$$d = f' \sin(10 \text{ degrees})$$

if we assume that the wedge-shaped part is not a truncated wedge. Accordingly, when the FIB milling angle is known and the wedge-shaped part is not truncated, it is only necessary to measure the length of the part of the wedge showing fringes, and it is not necessary to count the fringes.

It is noted that the light source is configured for projecting light with a coherence length substantially equal or larger than the sample thickness. The applicant has found that it is possible to observe interference fringes for a lamella with a thickness of 1.25 micrometers, using a maximum light source bandwidth of approximately 100 nm. Accordingly, a monochromatic light source is not absolutely necessary for measurements of the thickness of lamella for TEM characterization, which commonly have a thickness from 100 to 300 nm. Of course, a monochromatic light source may be used, in particular for thicker samples.

According to a second aspect, the present invention provides a method for calibrating a thickness measure as established using one of the methods or embodiments thereof as described above, wherein the method comprises the steps of:

establish a first measure for the distance or the change in distance between said first surface and said second surface of a first sample or sample part with a known first thickness using said one of the methods or an embodiment as described above, establish a second measure for the distance or the change in distance between said first surface and said second surface of a second sample or sample part with a known second thickness, which is different from the first thickness, using said one of the methods or the embodiments as described above, compare the first measure with the first thickness and the second measure with the second thickness, and establish a relation between the measure for the distance or the change in distance between said first surface and said second surface as established with said one of the methods or the embodiments as described above, and the actual thickness of a sample.

As presented above, the interferometric reflectance or transmittance is dependent on the thickness of the sample, but also, inter alia, on the refractive index of the sample material (which may also be dependent of the wavelength of the light), the angle of incidence, and the wavelength of the light. By using the calibration method as described above, it is not necessary to establish values for the parameters of the specific setup and/or properties of the specific sample material.

In an embodiment, the method further comprises the steps of:

setting the incident light power at a well-known value, measuring the apparent brightness of a range of samples with different thicknesses, and establish a relation between the apparent brightness and the thickness of a sample.

It is noted that the step of measuring the apparent brightness of a range of sample with different thicknesses, may be done by taking images of a bunch of lamellae with different thicknesses and storing the observed pixel intensities as a reference. In order to speed up the process, several lamellae with different thicknesses may be observed in one image.

For subsequent images of lamella which are acquired with the same illumination settings (same incident light power, same optics, filters, dichroic in the light optical system), the observed lamella brightness is mapped to the reference measurements.

A disadvantage of the above calibration methods is, that we need several samples of different and known thicknesses to perform this method. In order to solve this problem, the following method for calibrating a thickness measure can be used.

According to a third aspect, the present invention provides a method for calibrating a thickness measure as established using one of the methods, wherein the method comprises the steps of:

establish a first measure for the distance or the change in distance between said first surface and said second surface using said one of the methods or the embodiments as described above, using the focused ion beam exposure system to remove a layer of material from said sample, establish a second measure for the distance or the change in distance between said first surface and said second surface using said one of the methods or the embodiments as described above, and compare the difference between the first and second measure with an expected decrease of the thickness of the sample, preferably based on settings of the focused ion beam exposure system as used for removing said layer of material from the sample, and establish a relation between the measure for the distance or the change in distance between said first surface and said second surface as established with said one of the methods or the embodiments as described above, and the expected decrease of the thickness of a sample.

In particular, when the rate of material removal by the FIB machining is known, the thickness of the layer of material removed from the sample can be established relatively accurately, which allows for an accurate comparison between the difference between the first and second measure and the change in thickness due to the FIB removal of said layer of material from the sample.

By repeating the procedure, the method for calibrating the thickness measure can be extended for more different thicknesses of the sample, without needing a large set of samples with a different thickness.

In an embodiment of the method for calibrating according to the second or third aspect as described above, said relation is established using a machine learning approach and/or an artificial neural network. Accordingly, the machine learning approach and/or the artificial neural network can be used to establish a relation between the results from a measurement of the collected light and the thickness of a sample in said machine or in said artificial neural network, which can subsequently be used to establish an estimate of the thickness of a subsequent sample on the basis of a subsequent measurement of the collected light from said subsequent sample.

For example, when using the FIB to manufacture a lamella with a thickness X, the measured thickness using the light optical system may yield a thickness x' with an uncertainty y; x'±y. By studying the same lamella in a SEM, the actual thickness of the lamella can be measured in the SEM may yield a thickness X with an uncertainty z; X±z, wherein z is smaller, preferably much smaller, than y. The machine learning approach and/or the artificial neural network is used to establish a relation between the measurements of the light optical system and the actual thickness as measured in a SEM, using multiple examples of lamella with thicknesses within a range of interest. Accordingly, the input data are the measurements of the light optical system and output data is the actual thickness as measured in a SEM, is used in the machine learning algorithm or the neural network. By using multiple iterations of comparison of the measurements of the light optical system and the actual thickness, said machine or said artificial neural network can produce an outputted thickness such that x' is increasingly similar to the actual thickness X, and/or such that the uncertainty y is increasingly lower, in particular increasingly similar to the uncertainty z.

According to a fourth aspect, the present invention provides an apparatus for micromachining of samples, wherein the apparatus comprises an integral combination of:

a sample holder for holding a sample,
   a focused ion beam exposure system comprising an assembly for projecting a focused ion beam onto a first position where, in use, the focused ion beam impinges on the sample held by the sample holder, and
   a light optical microscope, wherein the light optical microscope is configured for imaging or monitoring said first position,
   wherein the apparatus further comprises a controller, wherein the controller is configured for performing one or more of the methods or the embodiments as described above or the embodiments as described above or the embodiments as described above.

Preferably, the light optical system comprises an imaging detector and/or a detector with a wavelength selective element. The wavelength selective element preferably comprises a spectrometer or one or more light optical wavelength selective filters, such as a color filters. The output said imaging detector and/or said detector with the wavelength selective element is used for establishing a measure for a measure for the distance between said first surface and said second surface.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

12

Figure 1:
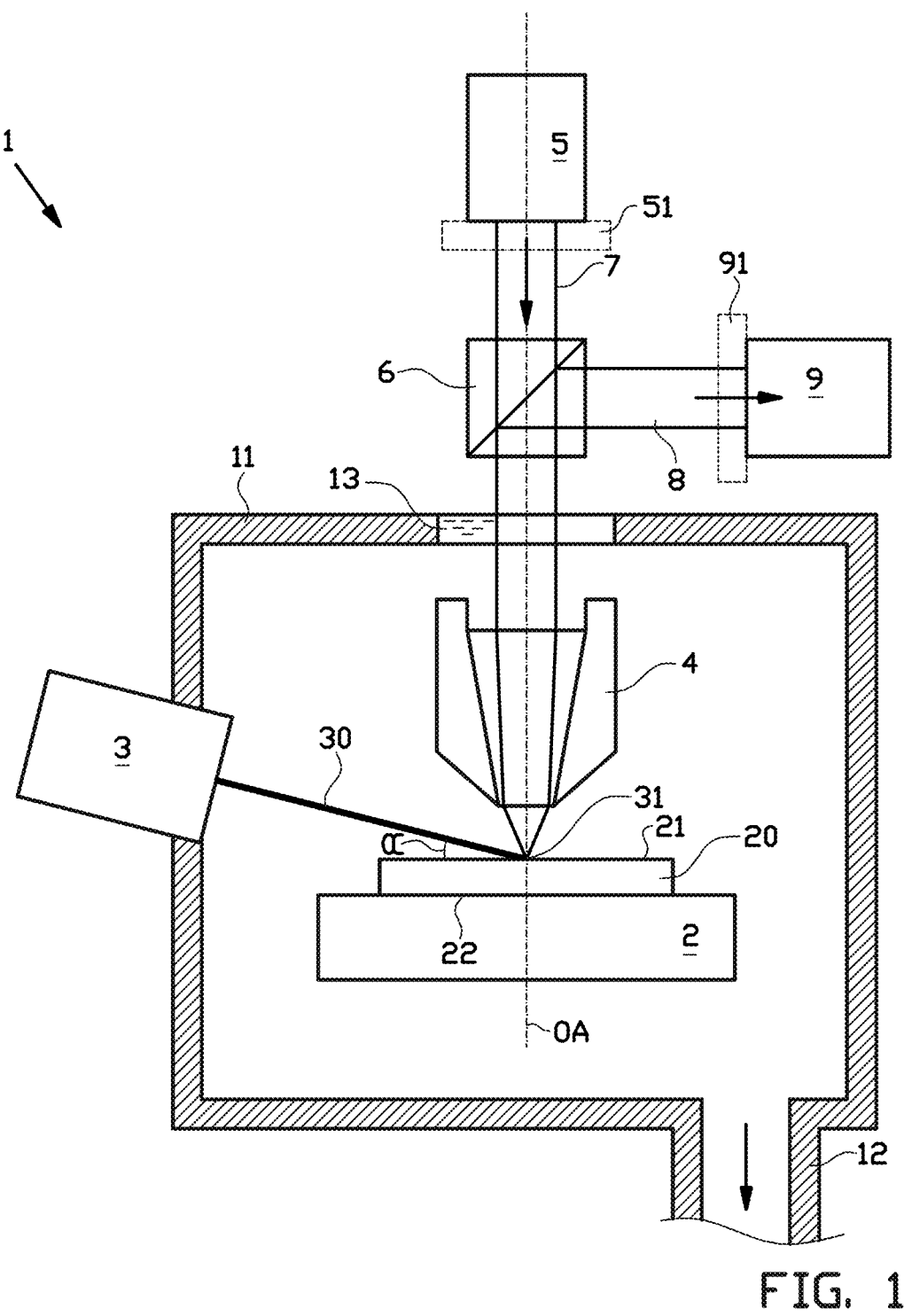
Figure 2:
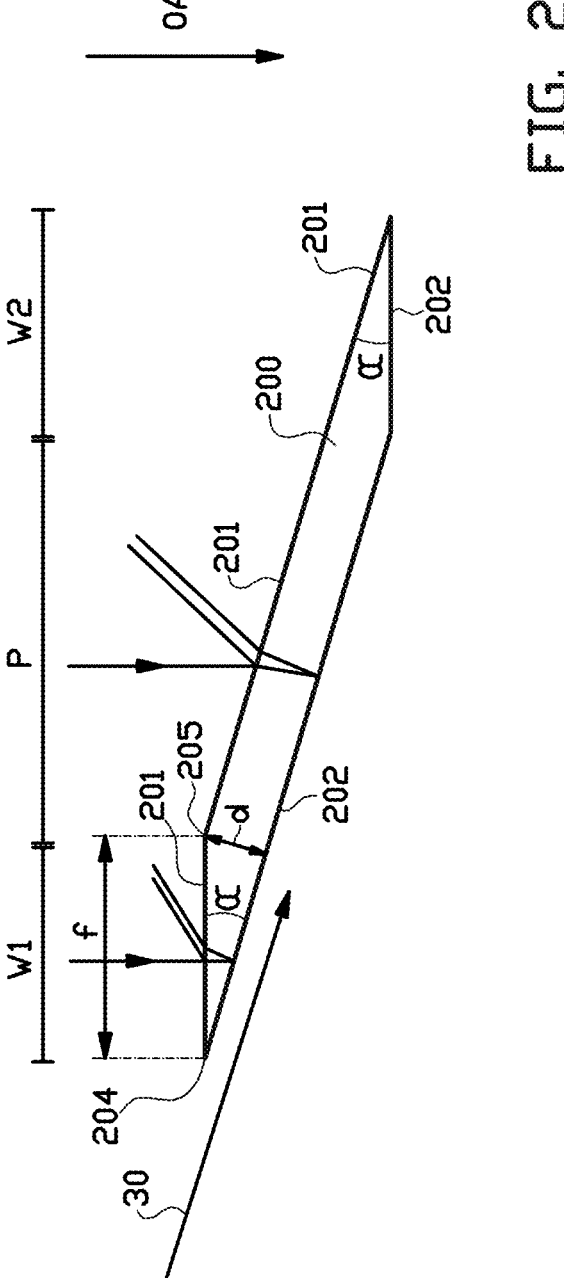
Figures 3A, 3B, 3C:
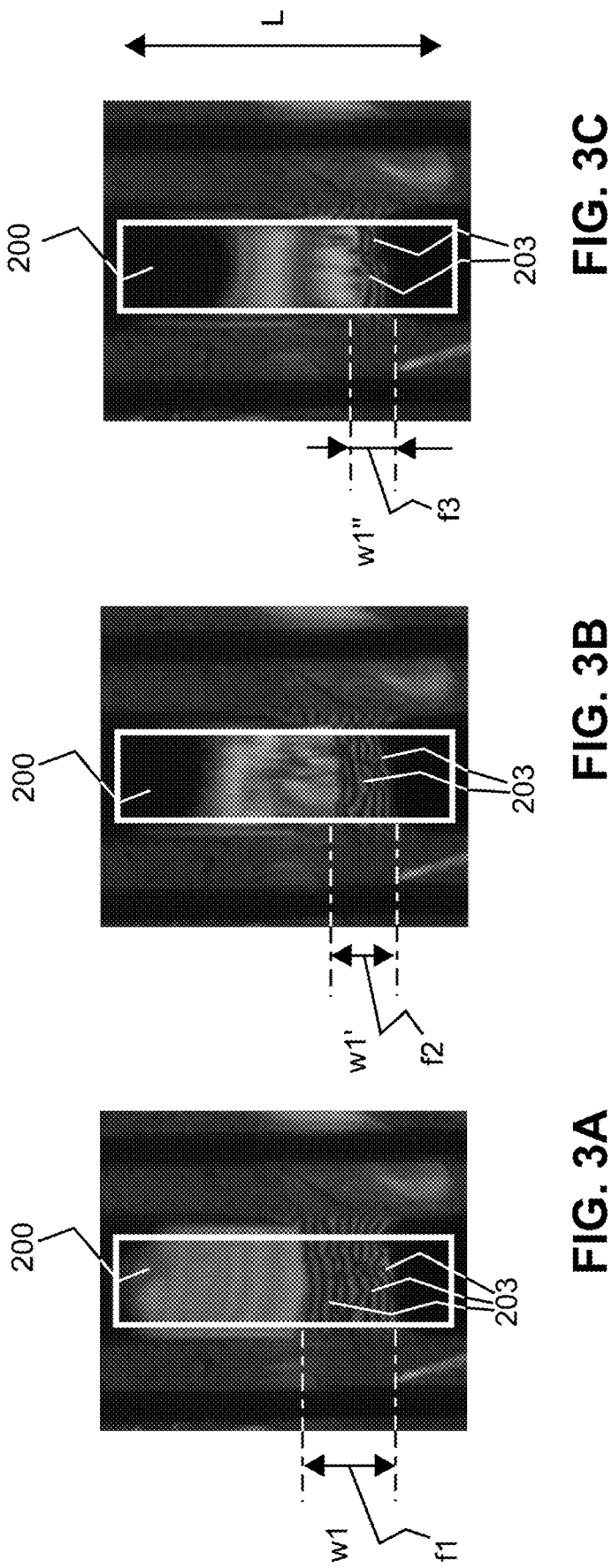
Figure 4:
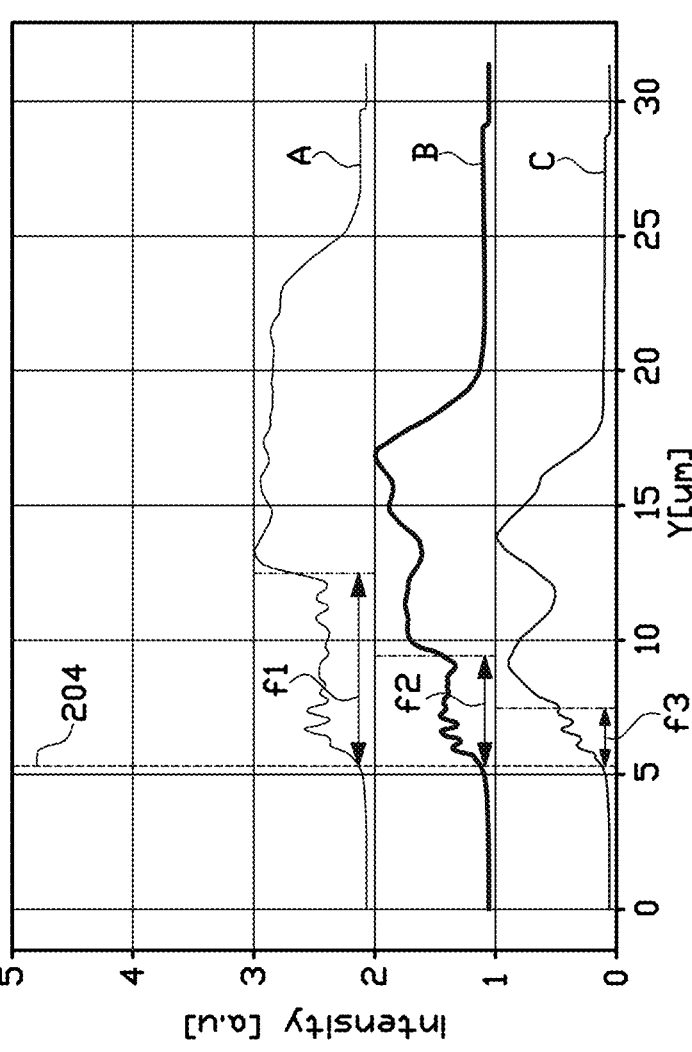
Figure 5:
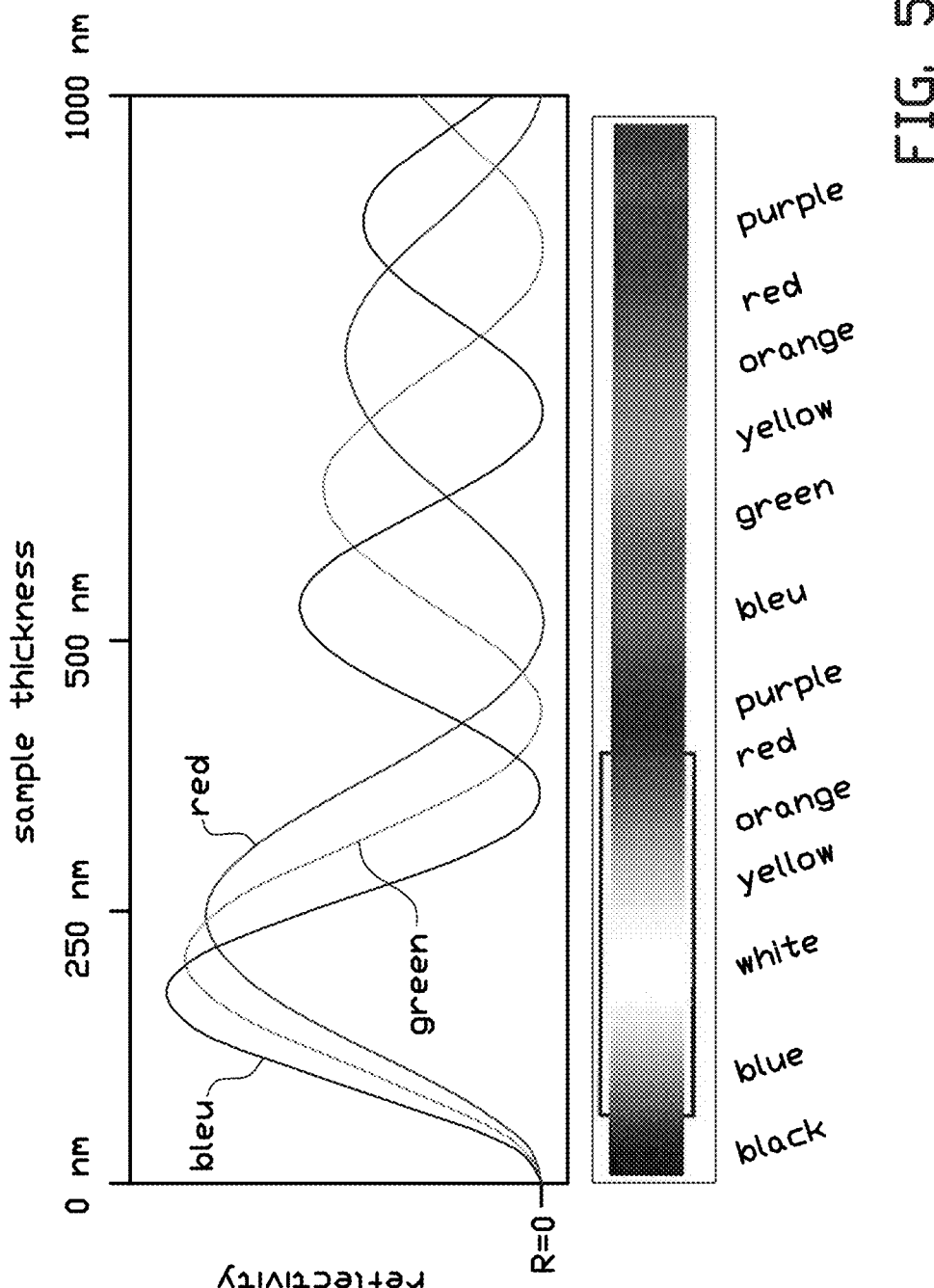
Figure 6:
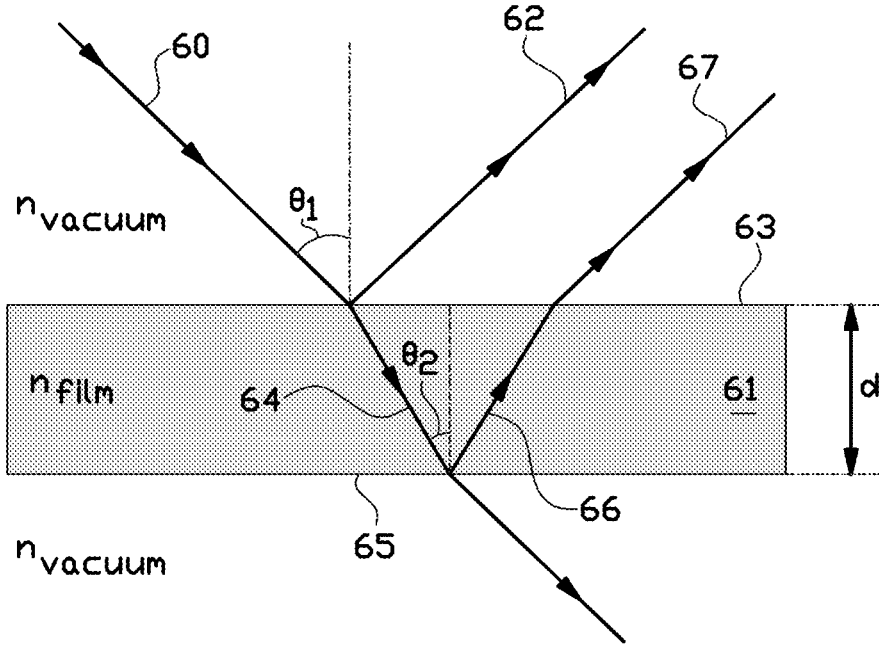
Figure 7:
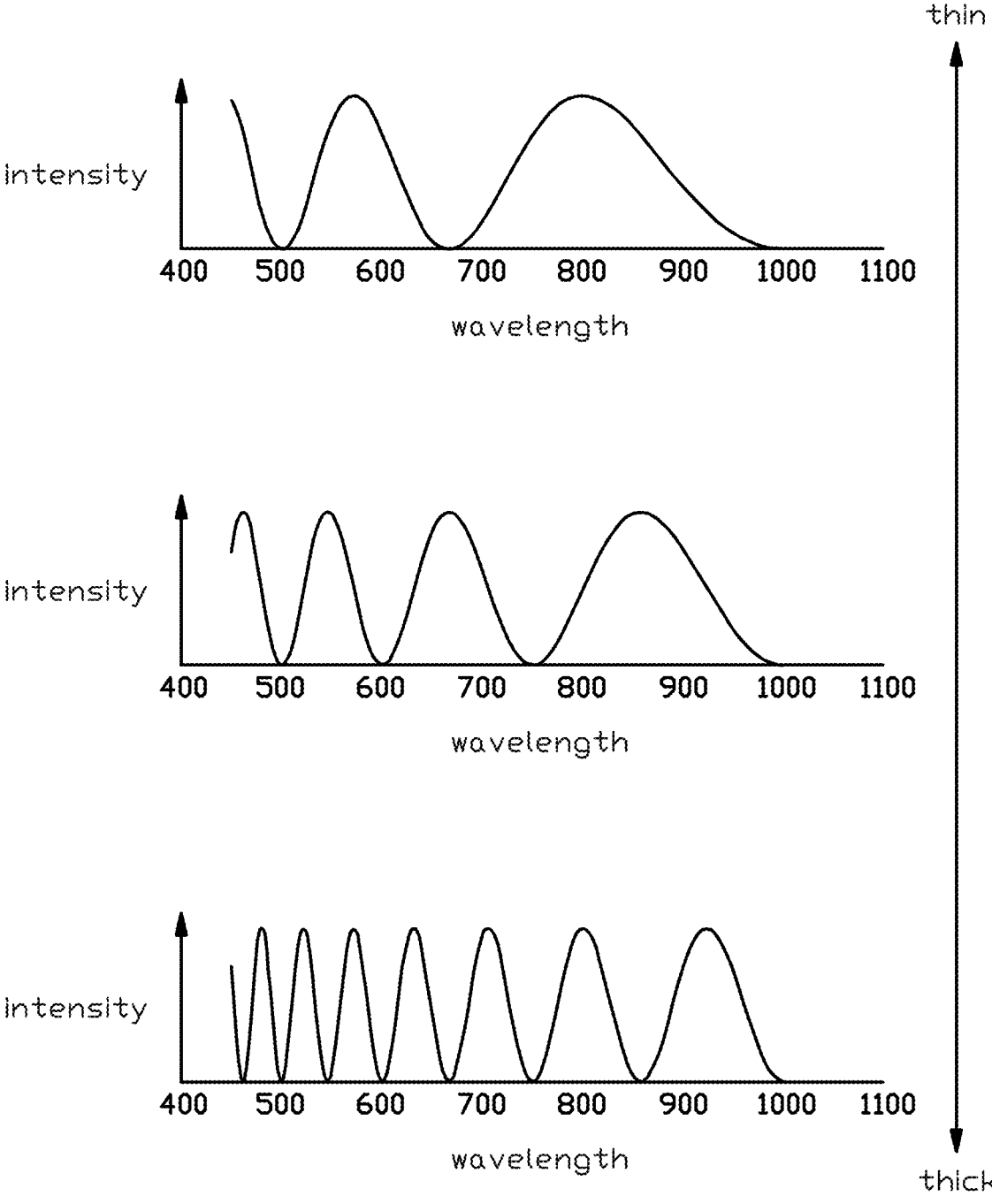
Figure 8:
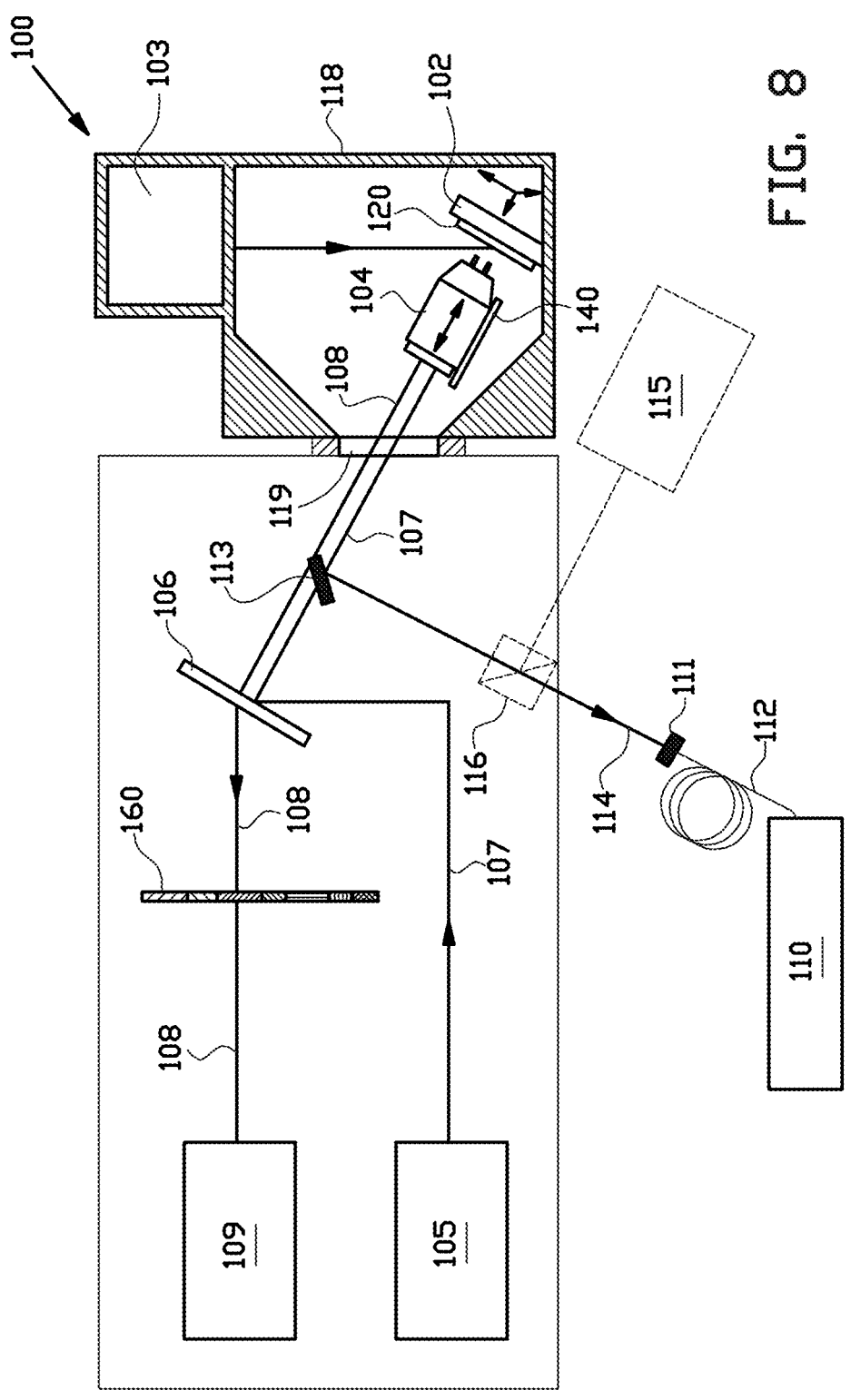
Figure 9:
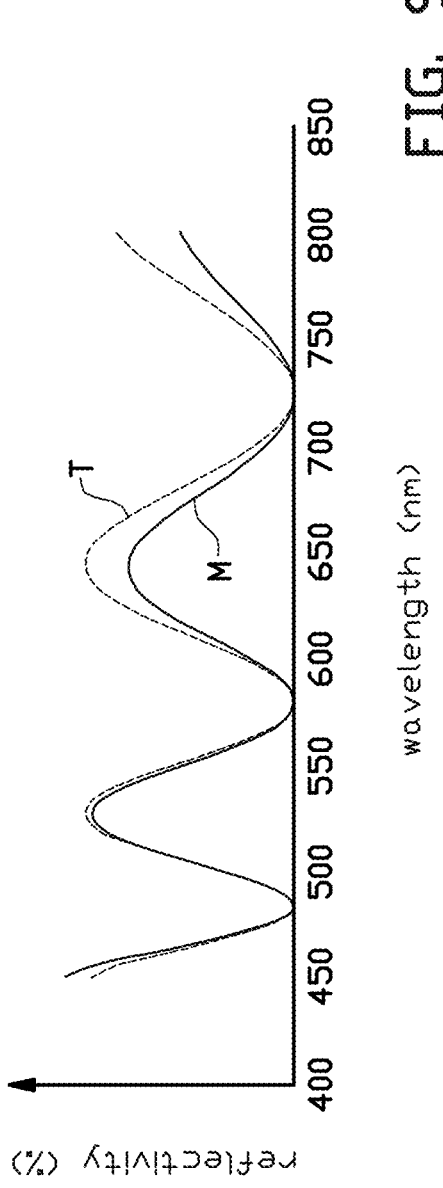
Figure 10:
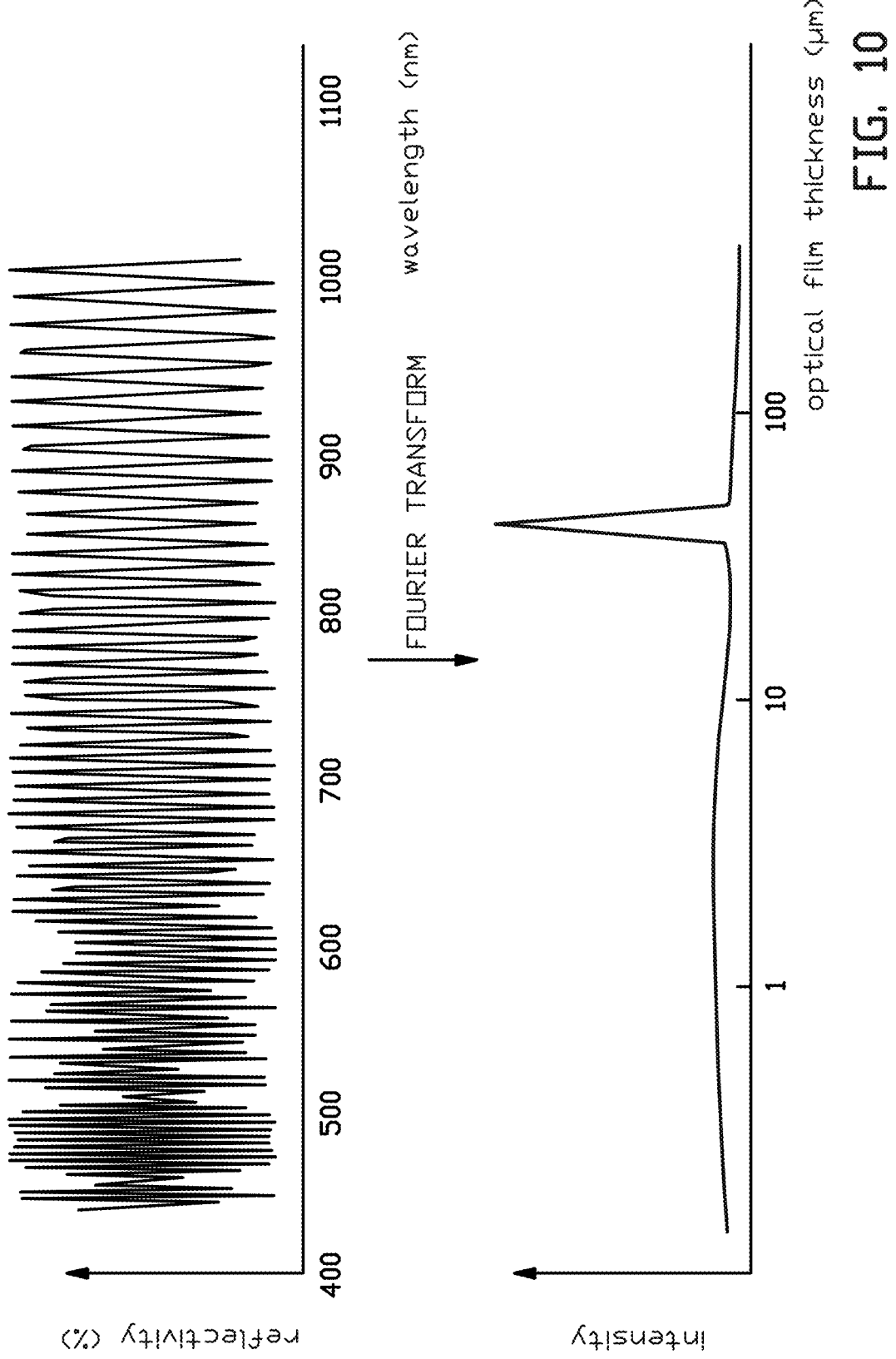

FIG. 1 schematically shows a first example of an integral LM/FIB apparatus according to the invention, FIG. 2 schematically shows a cross section of a lamella as produced by FIB micromachining;

FIGS. 3A, 3B, 3C schematically show an image of a part of a lamella, showing interference fringes in the wedged area of the lamella;

FIG. 4 schematically show densitometer readings of the interference fringes of the examples of FIGS. 3A, 3B and 3C;

FIG. 5 schematically shows that the observed combined 'colour' of the sample uniquely encodes the thickness of said sample;

FIG. 6 schematically shows the optical path of light beams reflected from an upper and a lower surface;

FIG. 7 schematically shows examples of the interferometric reflectance as a function of the wavelength for three different thicknesses of a sample;

FIG. 8 schematically shows a second example of an integral LM/FIB apparatus according to the invention, FIG. 9 schematically shows an example of an interference spectrum M as obtained from a thin transparent sample and using curve fitting for analysing said spectrum;

FIG. 10 schematically shows an example of an interference spectrum as obtained from a thick sample and using Fourier Transformation for analysing said spectrum.

DETAILED DESCRIPTION OF THE INVENTION

FIG. 1 schematically shows a first exemplary embodiment of an apparatus 1 according to the present invention. The apparatus 1 contains an integral combination of a sample holder 2 for holding a sample 20, a focused ion beam (FIB) exposure system 3, and a light optical microscope.

The light optical microscope comprises an objective lens 4, a light source 5 and a detector 9. The light source 5 is configured to direct light 7 from the light source 5 towards the objective lens 4, which is configured to focus the light onto the sample 20 on the sample holder 2. In the beam path in between the light source 5 and the objective lens 4, a half transparent mirror or dichroic mirror 6 is arranged, which is configured to pass at least part of the light 7 from the light source 5 towards the objective lens 4 to illuminate the sample 20.

The objective lens 4 is furthermore configured to collect light coming from the sample 20. The light collected by the objective lens 4 is at least partially reflected by the half transparent mirror or dichroic mirror 6 to direct said collected light 8 towards the detector 9.

Accordingly, the light optical microscope is configured to observe the sample 20 on the sample holder 2, taking optical measurement and/or optical images from the sample 20.

As schematically shown in FIG. 1, the FIB exposure system 3 is configured to project a focused ion beam 30 onto the surface of the sample 20 on the sample holder 2. Preferably, the beam spot size and/or the beam current of the focused ion beam 30 are configured so that the focused ion beam 30 can remove material from the surface of the sample 20, and thus can micro-machine the sample 20.

The focused ion beam exposure system 3 is typically arranged inside a vacuum chamber 11 which is connected to a vacuum pump via a connector 12.

As schematically shown in FIG. 1, the sample holder 2 and the microscope objective 4 are also arranged inside the vacuum chamber 11. Also, the other parts of the light optical microscope may be arranged inside the vacuum chamber 11, but preferably at least the light source 5 and the detector 9 are arranged in an illumination and detection part, outside the vacuum chamber 11. Accordingly, the vacuum chamber 11 is provided with an optical window 13 which is arranged in the light beam path between the half transparent mirror or dichroic mirror 6 and the microscope objective 4. By positioning the illumination and detection part outside the vacuum chamber 11, the light source and the detector 9 do not have to be vacuum-proof.

Because of the integral combination of the light optical microscope and the FIB exposure system 3, the optical axis OA of the light optical microscope and the focused ion beam 30 axis are at least partially linked by design. This relation between the optical axis OA of the light optical microscope and the focused ion beam 30 allows to establish from the one or more light microscopy measurements or images where (position) and how (spatial orientation) to position the sample 20 in order to machine the desired part(s) of the sample 20 with the Focused ion beam 30.

It is noted that the FIB exposure system 3 is configured for projecting the focused ion beam 30 onto a first position 31. The sample 20 is positioned by the sample holder 2 so that the first position 31 at least substantially coincides with a position on the sample 20 which needs to be treated by the focused ion beam 30. Preferably, the first position 31 is arranged so that it can be imaged or monitored by the light optical microscope. In the example as shown in FIG. 1, the first position is arranged at or near the optical axis OA of the light optical microscope.

It is further noted that the light optical microscope may also be arranged under the sample holder 2, wherein the sample holder is then configured to allow the light optical microscope to image the sample from below through an opening and/or a transparent part in the sample holder 2. In such an arrangement, there is the possibility to include a SEM at the topside which then results in a system comprising a light optical microscope below the sample holder 2 and a FIB/SEM system at the topside of the sample holder 2.

In use, light 7 from the light source 5 is directed towards the objective lens 4, which is configured to illuminate the sample 20. When light is directed towards the sample 20, a first part of this light is reflected on the first surface 21 and a second part of this light is transmitted through the first surface 21 into the sample 20. This second part of light reaches the second surface 22 and is at least partially reflected at said second surface 22. The light reflected at said second surface 22 travels again through the sample 20, reaches the first surface 21 and is at least partially transmitted through said first surface 21. Accordingly, the part of the second part of light which is transmitted through said first surface 21, has traveled an additional distance from the first surface 21 to the second surface 22, and from the second surface 22 to the first surface 21, with respect to the first part of the light that is directly reflected on the first surface 21. This part of the second part of the light can interfere with the first part of the light that is directly reflected on the first surface 21, and this interference modulates the reflectivity of the sample. This modulation of the reflectivity due to interference of light reflected from the first surface 21 and the second surface 22, depends, inter alia, on the distance d between the first surface 21 and the second surface 22, on the refractive index of the material of the sample 20, on the angle of incidence of the light, and on the wavelength of the light.

Accordingly, the light 8 from the sample 20 that is collected by the objective lens 4 and directed to the detector 9, is modulated by the interference between light reflected from the first surface 21 and the second surface 22, and this modulation carries information about the thickness d of the sample 20. Accordingly, by analyzing the light 8 collected by the objective lens 4, and by establishing a measure for the modulation of an intensity of said collected light 8 due to an optical interference of said light from a first surface 21 of the sample 20 and light from a second surface 22 of the sample 21, the measure for the modulation of said collected light due to the optical interference can be used for establishing a measure for the distance d between said first surface 21 and said second surface 22.

It is noted that the first surface 21 of said sample 20 is facing towards the light collecting optics, which in this example is the objective lens 4 of the light optical microscope, and wherein the first surface 21 is arranged in between the second surface 22 of sample 20 and the objective lens 4 of the light optical microscope.

It is further noted that that the FIB exposure system 3 is configured for projecting the focused ion beam 30 onto the sample 20 at a FIB milling angle α. Accordingly, when the FIB exposure system 3 is used for FIB machining the sample 20, in particular for producing a lamella suitable for inspection in a TEM, the lamella has a cross-section as schematically shown in FIG. 2.

It is noted that the detector 9 may be an imaging detector and/or a detector with a spectrometer. Alternatively the detector 9 may be provided with one or more light optical wavelength selective filters 91, such as a color filters, and/or one or more light optical wavelength selective filters 51 can be arranged in front of the light source.

FIG. 2 schematically shows a cross section of a lamella 200 as produced by FIB micromachining using the FIB 30. The lamella 200 comprises three parts:

a first part W1, which is wedge shaped with an angle between the upper surface (first surface) 201 and the bottom surface (second surface) 202 which is substantially equal to the FIB milling angle α;

a second part P, wherein the upper surface 201 is substantially parallel to the bottom surface 202, and the distance between the upper surface 201 and the bottom surface 202 is the thickness d of the lamella 200; and a third part W2, which again is wedge shaped with an angle between the upper surface 201 and the bottom surface 202 which is substantially equal to the FIB milling angle α.

It is noted that the FIB machining is commonly used to shape both the upper surface 201 and the bottom surface 202 of the lamella 200.

It is further noted that the terms 'upper' and 'lower' relate to the orientation relative to the optical axis OA. Preferably the 'upper side' is the side of the lamella closest to the objective lens of the light optical system.

First Option for Obtaining a Measure for the Thickness of a Sample, in Particular of a Lamella:

During the FIB machining, the inventors observed interference fringes as shown in the examples in FIGS. 3A, 3B and 3C. The interference fringes, which are visible in the images of FIGS. 3A, 3B and 3C, are located at the end W1 of the lamella 200, in particular where the lamella 200 is tapered or wedge shaped. It is noted that the lamella 200 in FIGS. 3A, 3B and 3C are produced using a FIB milling angle α of 10 degrees.

FIG. 3A shows an image of the lamella 200 after a first FIB machining step of a sample. The image shows a part of the lamella 200 near the end W1. These images were acquired using illuminating light with a maximum intensity at approximately 463 nm and with a bandwidth of approximately 5 nm. The interference fringes 203 are clearly visible and extend in the image over a distance f1. FIG. 4, line A, shows the intensity (vertical) as a function of the position at the lamella 200 in a direction L parallel to the axial direction of the lamella 200. FIG. 4, line A, allows to accurately determine the distance f1, which in this example is 7.23 micrometres. If we assume that the bottom end of the part of the image with the fringes 203 corresponds with the tip 204 of the lamella, and that the top end of part of the image with the fringes 203 corresponds with the transition 205 from the wedge-shaped part W1 to the parallel part P, then the wedge-shaped part W1 extends over a distance f1. Accordingly, at the transition 205, the thickness d of the lamella is:

$$d = f1\sin(10°) = 1.25 \text{ micrometers}$$

FIG. 3B shows an image of the lamella 200 after a subsequent second FIB machining step of a sample, after the first FIB machining step. The image shows the same part of the lamella 200 as FIG. 3A. The interference fringes 203 extend in the image over a distance f2. FIG. 4, line B, shows the intensity (vertical) as a function of the position at the lamella 200 in a direction L parallel to the axial direction of the lamella 200. FIG. 4, line B, allows to accurately determine the distance f2, which in this example is 4.17 micrometres. The wedge-shaped part W1' now extends over a distance f2. Accordingly, at the transition 205, the thickness d' of the lamella is:

$$d' = f2\sin(10°) = 0.72 \text{ micrometers}$$

FIG. 3C shows an image of the lamella 200 after a subsequent third FIB machining step of a sample, after the second FIB machining step. The image shows the same part of the lamella 200 as FIGS. 3A and 3B. The interference fringes 203 extend in the image over a distance f3. FIG. 4, line C, shows the intensity (vertical) as a function of the position at the lamella 200 in a direction L parallel to the axial direction of the lamella 200. FIG. 4, line C, allows to accurately determine the distance f3 which in this example is 2.22 micrometres. The wedge-shaped part W1" now extends over a distance f3. Accordingly, at the transition 205, the thickness d" of the lamella is:

$$d'' = f3\sin(10°) = 380 \text{ nanometers}$$

It is noted that the lines A, B and C in FIG. 4 are shown with a vertical offset in order to more clearly show the different lines.

It is further noted that this method for establishing a thickness d of the lamella 200, provides a measure for the thickness at the transition 205 from the wedge-shaped part W1 to the parallel part P. This method provides little information about thickness variation over the entire length of the lamella.

Second Option for Obtaining a Measure for the Thickness of a Sample, in Particular of a Lamella:

As discussed above, the reflectivity of a thin film is a function of the thickness d and the wavelength λ, at a certain angle of incident θ of the light on the surface of the sample:

$$R(\lambda, d) \propto \sin^2\left(\frac{\pi n(\lambda)d\cos(\theta)}{\lambda}\right)$$

Accordingly, by imaging the lamella 200 with the light microscope at a number of different wavelengths, preferably 3 or more different wavelengths, a multi-colour measurement of the reflectivity can be obtained. For example, by using proper filters 51 at the light source 5 and/or proper filters 91 at the detector 9, as schematically shown in FIG. 1, the lamella 200 can be imaged in e.g. blue (around 440 nm), green (around 532 nm), and red (around 635 nm) light. Within the thickness range of interest, which ranges from approximately 100 nm up to approximately 1000 nm), the observed combined 'colour' of the lamella uniquely encodes the thickness, as schematically shown in FIG. 5.

FIG. 5 schematically shows the reflectivity of blue, green and red light due to interference as a function of the sample thickness. When combining the reflectivity curves of the three colours of light, a combined 'colour' of the reflected light can be constructed which encode the thickness of the sample. In particular, for samples with a thickness ranging from 0 to 400 nm, the combined 'colour' goes from black-blue-white-yellow-orange to red. For sample with a thickness ranging from 500 nm-1000 nm, the combined 'colour' goes from purple-blue-green-yellow-orange-red-purple. Within these two ranges, the 'colour' of the reflected light can provide a measure for the thickness of the sample, in particular a measure for the thickness of a lamella.

It is noted that this method allows to measure the lamella thickness in the bulk of the lamella (in the second part P of FIG. 2).

It is further noted that the interference fringes at the wedge-shaped parts at the ends of the lamella, as used in the previous method, may interfere with the 'colour' measurement, and may make the 'colour' measurement difficult.

In addition, this method also allows to visualise thickness variations over the length of the lamella 200. E.g. by providing a combined 'color' image of the lamella, these thickness variations result in 'color' changes in said image.

Third Option for Obtaining a Measure for the Thickness of a Sample, in Particular of a Lamella:

As discussed in more detail above, optical interferometry can be used on a FIB milled sample. As schematically shown in FIG. 6, when a light beam 60 is directed towards the at least partially FIB-milled sample 61, a first part 62 of this light is reflected on the first surface 63 and a second part 64 of this light is transmitted through the first surface 63 into the sample 61. This second part 64 of light reaches the second surface 65 and is at least partially reflected 66 at said second surface 65. The light reflected 66 at said second surface 65 travels again through the sample 61, reaches the first surface 63 and is at least partially transmitted 67 through said first surface 63. Accordingly, the part 67 of the second part 64 of the light which is transmitted through said first surface 63, has traveled an additional distance from the first surface 63 to the second surface 65, and from the second surface 65 to the first surface 63, with respect to the first part 62 of the light that is directly reflected on the first surface 63. This part 67 can interfere with the first part 62 of the light, and whether the interference is constructive or destructive depends, inter alia, on the distance d between the first surface 63 and the second surface 65, on the refractive index $n_{film}$ of the material of the sample 61, on the angle of incidence θ, and on the wavelength λ of the light.

It is noted that for cryo-lamella, the material of the sample 61 is predominantly homogeneous ice (ideally amorphous) with a refractive index $n_{film}$ between 1.26 and 1.29 in the UV and Visible spectrum range. Since the sample is arranged in a vacuum environment, the reflection at the first surface 63 introduces a 180° phase shift in the reflected 62 waves, because $n_{vacuum} < n_{film}$. The reflection at the second surface 65 will not change the phase of the reflected 66 wave, because $n_{film} > n_{vacuum}$.

The reflected light beams 62, 67 will interfere with the following condition for constructive interference of reflected light:

$$2n_{film}d\cos(\theta_2) = (m - 0.5)\lambda$$

and the following condition for destructive interference of reflected light:

$$2n_{film}d\cos(\theta_2) = m\lambda$$

When the parts of the light are considered that experiences destructive interference, the following dependency can be used to determine the thickness of a sample:

$$d = \frac{m\lambda}{2n(\lambda)\cos\theta}$$

wherein d is the distance between the first surface 63 and the second surface 65 and corresponds to the thickness of the sample, m is an integer, $\lambda$ is the wavelength of the light, $n(\lambda)$ is the refractive index of the material of the sample (which may be dependent on the wavelength), and $\theta$ is the angle of incidence of the light on the second surface 65.

Due to this interference, the reflected light is modulated as a function of the wavelength as schematically shown in FIG. 7. As shown in FIG. 7, when the thickness of the sample increases, the number of signal intervals, in particular in the short wavelength range, increases. Accordingly, the modulation of the reflectance due to the interference can provide a measure for the thickness of the sample.

The method can be applied in a fluorescence-FIB microscope for any type of material with refractive index (enough) larger than 1, and relatively low light absorption through the sample thickness to enable the incident and reflected light propagation through the layer. In theory, the more transparent the material in VIS-NIR (e.g. glass, amorphous ice), the larger maximum thicknesses value that can be successfully measured. Highly light extinctive materials, such as thin metallic layers, can be measured within limited thickness values (up to ~30-50 nm).

The requirements for an optical thickness inspection method are strictly related to the properties of a cryo-lamella (majority of water ice) or any other FIB-milled material in a lamella fabrication process at cryogenic or room temperatures. These requirements and constrains are:

1. The refractive index of the material has to be sufficiently higher than $n_{vacuum}=1$ to obtain reflections on the top and bottom boundaries of the thin film.
   A biological material cryo-lamella sample in majority contains either amorphous or crystalline ice (when devitrified). The refractive index of a crystalline and amorphous ice at different cryogenic temperatures measured in vacuum can be found in prior art publications. E.g. at 90 K temperature, the refractive indexes (in VIS) at the boundaries between a cryo-lamella and vacuum are $n_{ice}=\sim1.27$ and $n_{vacuum}=1.0$, respectively. These values show an analogous situation to that of a soap bubble in air ($n_{ice} > n_{vacuum}$), thus we can expect the same interference behavior under exposure to light.

2. A typical cryo-lamella surface for cryo-TEM characterization corresponds to a few hundreds of square microns, with dimensions ranging ~5-20 µm in length, and ~10-20 µm in width.

3. A typical cryo-lamella thickness for cryo-TEM characterization varies from 100 to 300 nm. The thicker the lamella, the less information can be retrieved from a tomogram, thus an accurate thickness control is essential during the FIB milling process.

4. A typical cryo-lamella exhibits very low surface roughness, due to the sub-wavelength interaction volume between the material and the FIB beam. For such a low surface roughness, scattering of an incident light is low, and specular reflection is obtained at the top and bottom boundaries, thus a thin-film interferometry at a microscopic scale is possible.

5. A successful optical inspection of a cryo-lamella requires small irradiation spot, with a focus diameter smaller than dimensions of a lamella, as described in point 2. Thus, the incident and reflected light must be focused and collected by the same microscope objective lens, and the interferometer must be coupled with that objective lens either by means of an optical fiber, or a free-space optical system.

6. In practice, a typical reflectance interferometer can be coupled to any optical system, that maintains the same spectral range of the incident and collected light, which carries the phase-shift information. Thus, addition of a dichroic or color band-pass optical filters might reduce performance of such a system. Such a system can be composed of UV-VIS-NIR transparent optical components, such as microscope objective lens, air-vacuum sealing optical window, etc.

An example of a system combining a thin-film reflectance interferometer coupled to a FM-FIB microscope is shown in FIG. 8.

FIG. 8 schematically shows a second exemplary embodiment of an apparatus 100 according to the present invention. The apparatus 100 contains an integral combination of a sample holder 102 for holding a sample 120, a focused ion beam (FIB) exposure system 103, and a light optical microscope.

The light optical microscope comprises an objective lens 104, a light source 105 and a camera 109. The light source 105 is configured to direct light 107 from the light source 105, via a dichroic mirror 106 towards the objective lens 104, which is configured to focus the light onto the sample 120 on the sample holder 102. The objective lens 104 is arranged on a stage 140 for moving the objective lens 104 towards or away from the sample holder 102. The objective lens 104 is furthermore configured to collect light 108 coming from the sample 120. The light collected 108 by the objective lens 104 substantially passes through said dichroic mirror 106, passes through a filter wheel 160 and is directed to said camera 109. Accordingly, the light optical microscope is configured to observe the sample 120 on the sample holder 102, taking optical measurement and/or optical images from the sample 120.

It is noted that this basic setup with the filter wheel can be used for the method according to the second option as described above, when providing the filter wheel with the appropriate filters.

In addition to this basic setup, the apparatus 100 according to this second example further comprises a reflectance interferometer 110, and a beam splitter or mirror 113, which may be retractable to move the beam splitter or mirror 113 in the light beam 107, 108 of the optical microscope for directing light from the sample 120 and collected by the objective lens 104 towards the reflectance interferometer 110. The light 114 from the sample is coupled into an optical fiber 112 using a focusing lens 111.

It is noted that the reflectance interferometer 110 may use the same white-light source 105 from the light optical microscope. However, a dedicated light source 115 with an additional beam splitter 116 may also be applied.

As schematically shown in FIG. 8, the FIB exposure system 103 is configured to project a focused ion beam 130 onto the surface of the sample 120 on the sample holder 102. Preferably, the beam spot size and/or the beam current of the focused ion beam 130 are configured so that the focused ion beam 130 can remove material from the surface of the sample 120, and thus can micro-machine the sample 120.

The focused ion beam exposure system 103 is typically arranged inside a vacuum chamber 118 which is connected to a vacuum pump.

As schematically shown in FIG. 8, the sample holder 102 and the microscope objective 104 are also arranged inside the vacuum chamber 118. Also, the other parts of the light optical microscope may be arranged inside the vacuum chamber 118, but preferably the other parts are arranged in an illumination and detection part, outside the vacuum chamber 118. Accordingly, the vacuum chamber 118 is provided with an optical window 119 which is arranged in the light beam path between the dichroic mirror 106 and the microscope objective 104.

As long as the requirement in point 6 above is met and there is enough reflected light delivered to the interferometer 110, the optical geometry of such a system 100 can be modified. Addition of any transparent components in the optical path does not impact the interferometry data analysis, as such an interferometer can be calibrated in two steps:

1. Measuring interference pattern of a reflectance standard sample (e.g. a Si wafer of known thickness) at sufficient incident light intensity;
2. Measuring interference pattern of the system without any sample in the optical path (base line).

The calibration process allows to combine this interferometry method with systems that integrate in-air and in-vacuum optics, as reflections and phase-shift cause by a vacuum window can be corrected.

FIG. 9 shows an example of an interference spectrum M as obtained from a thin transparent sample with a thickness of approximately 600 nm.

Subsequently, the spectrum is analysed by using the theoretical relation between the reflectivity and the wavelength and using the thickness of the film as a parameter for curve fitting the measured spectrum M with said theoretical relation. The thickness of the film is the value of the thickness which provides to least Root Mean Square value between measured spectrum M and the theoretically calculated spectrum T.

FIG. 10 shows an example of an interference spectrum as obtained from a thick sample with a thickness of approximately 12.5 micrometres. As shown in FIG. 10, for thicker samples, the number of signal intervals increases.

This spectrum is subsequently analysed by Fast Fourier Transform (FFT) of the measured spectrum, which results in a value for the thickness as shown in FIG. 10. It is noted that this method is particularly suited for measuring samples with a thickness of more than 1 micrometre. Accordingly, for typical cryo-lamella thicknesses for cryo-TEM characterisation the FFT method is less suitable.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a method and an apparatus for micromachining samples. The apparatus comprises an integral combination of: a sample holder, a focused ion beam (FIB) exposure system for projecting a FIB onto a sample, and a light optical microscope (LM), wherein the LM is configured for imaging or monitoring the sample during and/or after FIB exposure. The method comprises the steps of:

using the LM projecting light towards the sample and collecting reflected and/or transmitted light from said sample;

analyzing the collected light and establishing a measure for the modulation of an intensity of said collected light due to an optical interference of light from a first surface of the sample and light from a second surface of the sample;

using the measure for the modulation of the intensity for establishing a measure for the distance between said first surface and said second surface.

The invention claimed is:

1. A method for inspecting a sample in an apparatus for micromachining samples, the apparatus including an integral combination of a sample holder for holding the sample, a focused ion beam exposure system comprising an assembly for projecting a focused ion beam onto a first position where, in use, the focused ion beam impinges on the sample held by the sample holder, and a light optical system, wherein the light optical system comprises a light source for projecting light towards the sample holder, light collecting optics for collecting at least part of the light from the sample on the sample holder, and a detector for detecting at least a part said collected light, wherein the light optical system comprises an imaging detector and/or a wavelength selective element, the method comprising the steps of:

providing a sample that has at least partially been micromachined by the focused ion beam exposure system;

projecting light towards the sample and collecting at least part of the light from said sample;

analyzing the light collected by the light collecting optics and establishing a measure for the modulation of an intensity of said collected light due to an optical interference of said light from a first surface of the sample and light from a second surface of the sample, wherein the first surface of said sample is facing towards the light collecting optics of the light optical system and wherein the first surface is arranged in between the second surface of sample and the light collecting optics of the light optical system, and wherein said measure is established for one or more positions on the sample and/or for one or more wavelengths of the projected light; and using the measure for the modulation of said collected light due to the optical interference for establishing a measure for the distance between said first surface and said second surface, wherein the detector comprises a spectrometer which is configured for measuring the intensity of the collected light from the sample as a function of the wavelength of said light, wherein the light source is configured for projecting light with a predetermined spectral intensity distribution towards the sample, wherein the step of analyzing the light collected by the light collecting optics further comprises:

measuring the intensity of the collected light from the sample as a function of the wavelength of said light using said spectrometer in order to establish the measure for the modulation of the intensity of said collected light due to the optical interference of said light from the first surface of the sample and light from the second surface of the sample, for various wavelengths of the projected light, and using the wavelength dependence of the modulation of the intensity of said collected light for establishing a measure for the distance between said first surface and said second surface.

2. The method according to claim 1, wherein the light source is configured to emit light comprising multiple wavelengths.

3. The method according to claim 2, wherein the light source is configured to emit light comprising substantially all wavelengths within a wavelength range.

4. The method according to claim 3, wherein a theoretical relation between the reflectivity of light at a thin film with thickness d due to interference and the wavelength of light, is used for curve fitting of the modulation of the intensity of said collected light due to the optical interference as a function of the wavelength, to establish a measure for the thickness d.

5. The method according to claim 4, wherein said curve fitting uses the following theoretical relation between the reflectivity R at a thin film and the wavelength:

$$R(\lambda, d) \propto \sin^2\left(\frac{\pi n(\lambda) d \cos(\theta)}{\lambda}\right)$$

where d is the thickness of the sample, $\lambda$ is the wavelength of the light, $n(\lambda)$ is the refractive index of the material of the sample, and $\theta$ is the angle of incidence of the light on the second surface.

6. A method for inspecting a sample in an apparatus for micromachining samples, the apparatus including an integral combination of a sample holder for holding the sample, a focused ion beam exposure system comprising an assembly for projecting a focused ion beam onto a first position where, in use, the focused ion beam impinges on the sample held by the sample holder, and a light optical system, wherein the light optical system comprises a light source for projecting light towards the sample holder, light collecting optics for collecting at least part of the light from the sample on the sample holder, and a detector for detecting at least a part said collected light, wherein the light optical system comprises an imaging detector and/or a wavelength selective element, the method comprising the steps of:

providing a sample that has at least partially been micromachined by the focused ion beam exposure system;

projecting light towards the sample and collecting at least part of the light from said sample;

analyzing the light collected by the light collecting optics and establishing a measure for the modulation of an intensity of said collected light due to an optical interference of said light from a first surface of the sample and light from a second surface of the sample, wherein the first surface of said sample is facing towards the light collecting optics of the light optical system and wherein the first surface is arranged in between the second surface of sample and the light collecting optics of the light optical system, and wherein said measure is established for one or more positions on the sample and/or for one or more wavelengths of the projected light; and using the measure for the modulation of said collected light due to the optical interference for establishing a measure for the distance between said first surface and said second surface, wherein the light source is configured for projecting light with at least three different wavelengths towards the sample on the sample holder, wherein the step of analyzing the light collected by the light collecting optics further comprises:

measuring the intensity of the collected light from the sample for each one of the at least three different wavelengths in order to establish the measure for the modulation of the intensity of said collected light due to an optical interference of the light from the first surface of the sample and light from the second surface of the sample, for each one of the at least three different wavelengths of the projected light, and using the wavelength dependence of the modulation of the intensity of said collected light for establishing a measure for the distance between said first surface and said second surface.

7. The method according to claim 6, wherein the light source is configured for projecting light with said at least three different wavelengths separately and/or consecutively towards the sample, and wherein the intensity of the collected light from the sample is separately and/or consecutively measured for each one of the at least three different wavelengths.

8. The method according to claim 6, wherein the light source is configured for projecting light with said at least three different wavelengths substantially simultaneously towards the sample, wherein the detector is configured for measuring the intensity of the collected light from the sample for each one of the at least three different wavelengths individually.

9. The method according to claim 8, wherein the detector comprises at least three sensors, wherein each sensor of said at least three sensors is configured for detecting light with one of said at least three different wavelengths.

10. A method for inspecting a sample in an apparatus for micromachining samples, the apparatus including an integral combination of a sample holder for holding the sample, a focused ion beam exposure system comprising an assembly for projecting a focused ion beam onto a first position where, in use, the focused ion beam impinges on the sample held by the sample holder, and a light optical system, wherein the light optical system comprises a light source for projecting light towards the sample holder, light collecting optics for collecting at least part of the light from the sample on the sample holder, and a detector for detecting at least a part said collected light, wherein the light optical system comprises an imaging detector and/or a wavelength selective element, the method comprising the steps of:

providing a sample that has at least partially been micromachined by the focused ion beam exposure system;

projecting light towards the sample and collecting at least part of the light from said sample;

analyzing the light collected by the light collecting optics and establishing a measure for the modulation of an intensity of said collected light due to an optical interference of said light from a first surface of the sample and light from a second surface of the sample, wherein the first surface of said sample is facing towards the light collecting optics of the light optical system and wherein the first surface is arranged in between the second surface of sample and the light collecting optics of the light optical system, and wherein said measure is established for one or more positions on the sample and/or for one or more wavelengths of the projected light; and using the measure for the modulation of said collected light due to the optical interference for establishing a measure for the distance between said first surface and said second surface, wherein the sample comprises a part with a substantially continuous increasing or decreasing thickness, wherein the step of analyzing the light collected by the light collecting optics further comprises:

measuring the intensity of the collected light from the sample as a function of the position on the sample on the part with a substantially continuous increasing or decreasing thickness and substantially in a direction in which the thickness of the sample increases or decreases, in order to establish the measure for the modulation of the intensity of said collected light due to the optical interference of said light from the first surface of the sample and light from the second surface of the sample, and using the position dependence of the modulation of the intensity of said collected light for establishing a measure for the change in distance between said first surface and said second surface in said part with the substantially continuous increasing or decreasing thickness.

11. The method according to claim 10, wherein the light source is configured to emit light comprising substantially all wavelengths within a wavelength range, wherein the modulation of the intensity of said collected light due to the optical interference of said light from the first surface of the sample and light from the second surface of the sample results in a change in the spectrum of the collected light with respect to the spectrum of the light from the light source, wherein said method further comprises the steps of:

analyzing the change in the spectrum of the collected light as a function of the position along a line which extends over said part in the direction in which the thickness of the sample increases or decreases, and using said change in the spectrum as a function of the position along said line for establishing a measure for the change in distance between said first surface and said second surface.

12. The method according to claim 11, wherein said wavelength range comprises substantially all wavelengths between 400 and 1100 nm.

13. A method for inspecting a sample in an apparatus for micromachining samples, the apparatus including an integral combination of a sample holder for holding the sample, a focused ion beam exposure system comprising an assembly for projecting a focused ion beam onto a first position where, in use, the focused ion beam impinges on the sample held by the sample holder, and a light optical system, wherein the light optical system comprises a light source for projecting light towards the sample holder, light collecting optics for collecting at least part of the light from the sample on the sample holder, and a detector for detecting at least a part said collected light, wherein the light optical system comprises an imaging detector and/or a wavelength selective element, the method comprising the steps of:

providing a sample that has at least partially been micromachined by the focused ion beam exposure system;

projecting light towards the sample and collecting at least part of the light from said sample;

analyzing the light collected by the light collecting optics and establishing a measure for the modulation of an intensity of said collected light due to an optical interference of said light from a first surface of the sample and light from a second surface of the sample, wherein the first surface of said sample is facing towards the light collecting optics of the light optical system and wherein the first surface is arranged in between the second surface of sample and the light collecting optics of the light optical system, and wherein said measure is established for one or more positions on the sample and/or for one or more wavelengths of the projected light; and using the measure for the modulation of said collected light due to the optical interference for establishing a measure for the distance between said first surface and said second surface, wherein the sample comprises a part with a substantially continuous increasing or decreasing thickness, wherein the method further comprises the steps of:

configuring the light source for projecting light with a coherence length substantially equal or larger than the sample thickness, towards the sample on the sample holder, wherein the modulation of the intensity of said collected light due to the optical interference of said light from the first surface of the sample and light from the second surface of the sample results in one or more fringes, establishing a distance in which said one or more fringes extends over said part in the direction in which the thickness of the sample increases or decreases, and using the number of said one or more fringes, a value of a refractive index of the sample material, and the wavelength of the projected light for establishing a measure for the change in distance between said first surface and said second surface between the outermost fringes of the number of said one or more fringes, or using said distance and an angle between the FIB beam and the surface of the sample for establishing a measure for the change in distance between said first surface and said second surface between the outermost fringes of the number of said one or more fringes.

14. A calibrating method for calibrating a thickness measure as established using the inspecting method according to any one of claims 1, 6, 10, and 13, wherein the calibrating method comprises the steps of:

establishing a first measure for the distance or the change in distance between said first surface and said second surface of a first sample or sample part with a known first thickness using said inspecting method, establishing a second measure for the distance or the change in distance between said first surface and said second surface of a second sample or sample part with a known second thickness, which is different from the first thickness, using said inspecting method, comparing the first measure with the first thickness and the second measure with the second thickness, and establishing a relation between the measure for the distance or the change in distance between said first surface and said second surface as established with said inspecting method, and the actual thickness of a sample.

15. The calibrating method according to claim 14, wherein said relation is established using a machine learning approach and/or an artificial neural network.

16. A calibrating method for calibrating a thickness measure as established using the method according to any one of claims 1, 6, 10, and 13, wherein the method comprises the steps of:

establishing a first measure for the distance or the change in distance between said first surface and said second surface using said inspecting method, using the focused ion beam exposure system to remove a layer of material from said sample, establishing a second measure for the distance or the change in distance between said first surface and said second surface using said inspecting method, and comparing the difference between the first and second measure with an expected decrease of the thickness of the sample, and establishing a relation between the measure for the distance or the change in distance between said first surface and said second surface as established with said inspecting method, and the expected decrease of the thickness of a sample.

17. The method according to claim 16, wherein the step of comparing the difference between the first and second measure with an expected decrease of the thickness of the sample is based on settings of the focused ion beam exposure system as used for removing said layer of material from the sample.

18. The method according to claim 16, wherein said relation is established using a machine learning approach and/or an artificial neural network.

19. An apparatus for micromachining of samples, the apparatus comprising an integral combination of:

a sample holder for holding a sample, a focused ion beam exposure system comprising an assembly for projecting a focused ion beam onto a first position where, in use, the focused ion beam impinges on the sample held by the sample holder, and a light optical microscope, wherein the light optical microscope is configured for imaging or monitoring said first position, wherein the light optical microscope comprises an imaging detector and/or a wavelength selective element, wherein the apparatus further comprises a controller, wherein the controller is configured for performing the method according to any one of claims 1, 6, 10, and 13.

\* \* \* \* \*